US006752230B1

(12) United States Patent
Huang

(10) Patent No.: US 6,752,230 B1
(45) Date of Patent: Jun. 22, 2004

(54) SUPPLEMENTARY WHEEL SUPPORT FOR A MOTORIZED WHEELCHAIR

(76) Inventor: Shao Shih Huang, 5F, No. 9, Lane 180, Tong Hua St., Da Ann Dist., Taipei (TW)

( * ) Notice: Subject to any disclaimer, the term of this patent is extended or adjusted under 35 U.S.C. 154(b) by 0 days.

(21) Appl. No.: 10/340,802

(22) Filed: Jan. 13, 2003

(51) Int. Cl.$^7$ .................................................. B62D 61/12

(52) U.S. Cl. .................... 180/209; 180/907; 280/304.1; 280/250.1

(58) Field of Search ................................ 180/22, 24.02, 180/24.13, 209, 15, 16, 19.1, 19.2, 907; 280/304.1, 250.1, 763.1, 767, 755, 764.1, 293, 301, 43, 43.13; 297/DIG. 4

(56) References Cited

U.S. PATENT DOCUMENTS 5,848,658 A * 12/1998 Pulver ........................ 180/65.1
6,179,076 B1 * 1/2001 Fernie et al. .............. 180/65.1
6,494,474 B1 * 12/2002 Kramer, Jr. .............. 280/304.1
6,601,863 B1 * 8/2003 Mentessi et al. ......... 280/304.1

* cited by examiner

*Primary Examiner*—Lesley D. Morris
*Assistant Examiner*—Matthew Luby
(74) *Attorney, Agent, or Firm*—Rosenberg, Klein & Lee

(57) ABSTRACT

A supplementary wheel support for a motorized wheelchair to provide a supplementary support, includes a chassis, rockers, wheel supports, buffers, springs, auxiliary wheels and tilt-proof wheels; both side rods of the chassis being respectively pivoted with one end of the rocker; another end of the rocker being pivoted to the wheel support; a buffer being fixed between the chassis and the rocker; the wheel support being bend for its both ends a bending portion to define a triangle; both ends of the wheel support being respectively pivoted to the auxiliary wheel and the tilt-proof wheel; the bending portion of the wheel support being pivoted to another end of the rocker; both ends of the spring being respectively provided on the rocker and the wheel support; and the wheel support being driven by the auxiliary wheel to rise for the tilt-proof wheel to descend and grab the ground.

2 Claims, 5 Drawing Sheets

SUPPLEMENTARY WHEEL SUPPORT FOR A MOTORIZED WHEELCHAIR

BACKGROUND OF THE INVENTION (a) Field of the Invention

The present invention relates to a supplementary wheel support chassis for a motorized wheelchair, and more particularly, to one that allows an auxiliary wheel and a tilt-proof wheel grab the ground at the same time while maintaining the central gravity of the wheelchair within the chassis to achieve a smooth driving.

(b) Description of the Prior Art

A motorized wheelchair generally available in the market is transmitted with four wheels constantly on the ground. The wheelchair is vulnerable to tilt over when bumping into a pit or climbing up or down a slope due to instable central gravity of the wheelchair. Therefore, as taught in the motorized chair base disclosed in U.S. Pat. No. 6,179,076, the manufacturing industry of motor-driven vehicle has come up with a design to have six wheels to grab the ground for achieving better stable central gravity. The six-wheel design is applicable to motor-driven cars including the power wheelchair by providing two motor-driven wheels in the existing 4-wheel structure so to keep the body stabilized with six wheels firmly grabbing the ground when traveling on rough road.

The six-wheel design is able to keep all six wheels contacting the ground in case of a rough road. However, the motor-driven wheels are provided at the center of the structure and only the motor-driven wheel is provided with a spring while the 4-wheel structure is fixed to where below four ends of the base. There is no spring or similar buffer provided between the base and those four wheels, meaning that the relative height of those four wheels is fixed. As a result, any higher protrusions, deeper pits or other barriers are found on the road, those four wheels may get stuck to prevent the car from moving on. Furthermore, the base on top of those four wheels shakes and swings in four directions to make the driver very uncomfortable since the relative height among four wheels is fixed.

SUMMARY OF THE INVENTION

The primary purpose of the present invention is to provide a supplementary support for a motorized wheelchair to keep the central gravity of the car within its chassis to achieve a smooth ride for the driver. To achieve the purpose, the present invention includes a chassis, rockers, wheel supports, buffers, springs, auxiliary wheels and tilt-proof wheels. Wherein, both side rods of the chassis are respectively pivoted to one end of the rocker. Another end of the rocker is pivoted to the wheel support and a buffer is fixed between the bottom of the chassis and the rocker. The wheel support bends for its both ends and a bending portion to define a triangle. Both ends of the wheel support are respectively pivoted to the auxiliary wheel and the tilt-proof wheel. The bending portion of the wheel support is pivoted to another end of the rocker. Both ends of the spring are respectively provided on the rocker and the wheel support. The wheel support is driven by the auxiliary wheel to rise for the tilt-proof wheel to descend to grab the ground and twist the spring. And the wheel support is restored to its original position by the spring upon the wheelchair is back on a flat road.

Another purpose of the present invention is to provide a supplementary wheel support with absorption. To achieve the purpose, a buffer is provided between the chassis and the rocker. The buffer is sandwiched by two hardwood pieces, and both hardwood pieces are packed with a resilient buffer pad. The buffer pad contains inside a hollow portion with the outer side of each hollow portion being provided with a gap for the buffer to function of absorption when the car travels on a rough road.

DETAILED DESCRIPTION OF THE PREFERRED EMBODIMENTS

Figure 1:
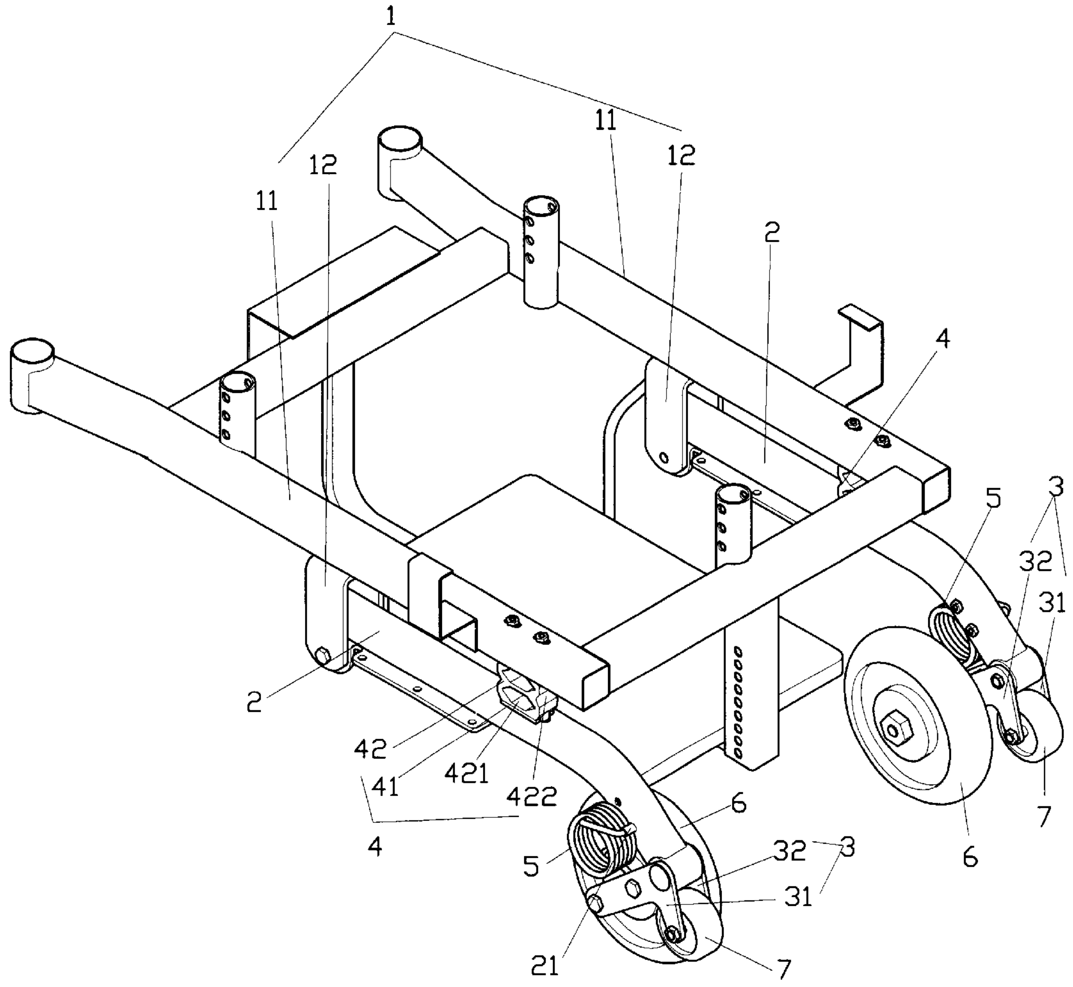
FIG. 1 is a perspective view of the present invention.

Referring to FIG. 1, a preferred embodiment of the present invention essentially comprises a chassis (1), a pair of rockers (2), a pair of wheel supports (3), a pair of buffers (4), a pair of springs (5), a pair of auxiliary wheels (6) and tilt-proof wheels (7).

The chassis (1) is provided beneath a seat to support the seat and comprises a pair of side rods (11). Each side rod (11) has a pivoting bracket (12) underneath the lower end of each side rod (11) of the chassis (1) to pivot one end of the rocker (2). One end of the buffer (4) is fixed under one end of each side rod (11).

Another end of the rocker (2) extends downward at a bend to be pivoted to the wheel support (3) and provides a retainer tube (21) close to the curved end of the rocker (2).

Each of the wheel supports (3) includes two bend plates (31) and (32) with both ends of the bend plate (31) & (32) and a bending portion to define a triangle. Both ends of the bend plate (31) and (32) of the wheel support (3) are respectively pivoted to the auxiliary wheel (6) and the tilt-proof wheel (7). The bending portion of the wheel support (3) is pivoted to the curved end of the rocker (2). A positioning tube (311), as illustrated in FIG. 3, is formed protruding inward on an inner side of the bend plate (31) to merely receive the insertion of one end of the spring (5) while another end of the spring (5) is inserted into the retainer tube (21) of the rocker (2).

The buffer (4) is guarded a hardwood piece (41) on the top and the bottom, and a buffer pad (42) is packed between both hardwood pieces (41). A hollow portion (421) is provided inside the buffer pad (42) and a gap (422) is provided on the out edge of the buffer pad (42). A fastener, e.g. a bolt and a nut as illustrated, or a fixation pin, is used to fix the hardwood pieces (41) respectively to, or alternatively, the hardwood piece (41) may be directly welded to or adhered to where below the side rod (11) of the chassis (1) and on the rocker (2).

Figure 2:
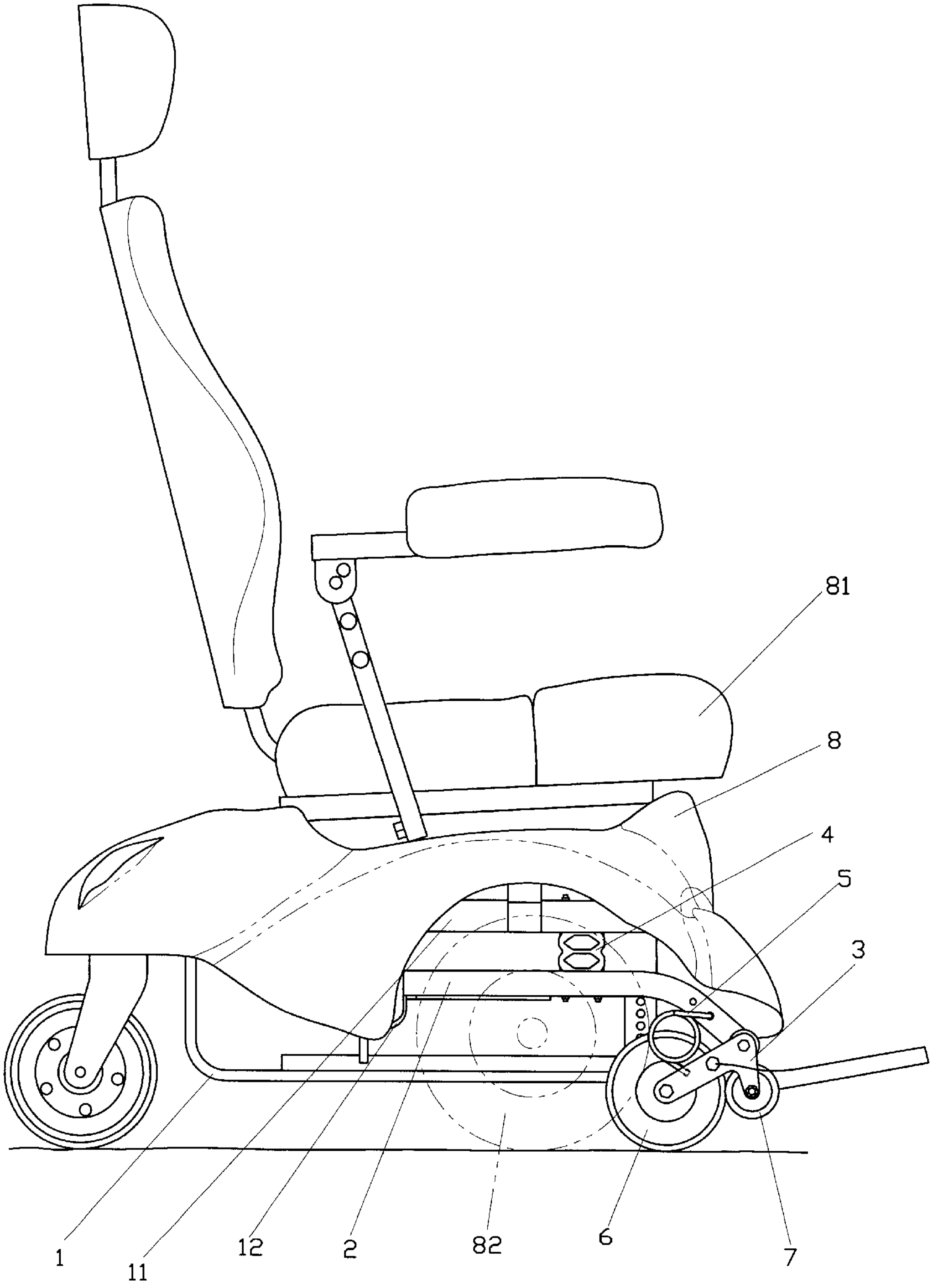
FIG. 2 is a side view of the present invention adapted to a motorized wheelchair.
Figure 3:
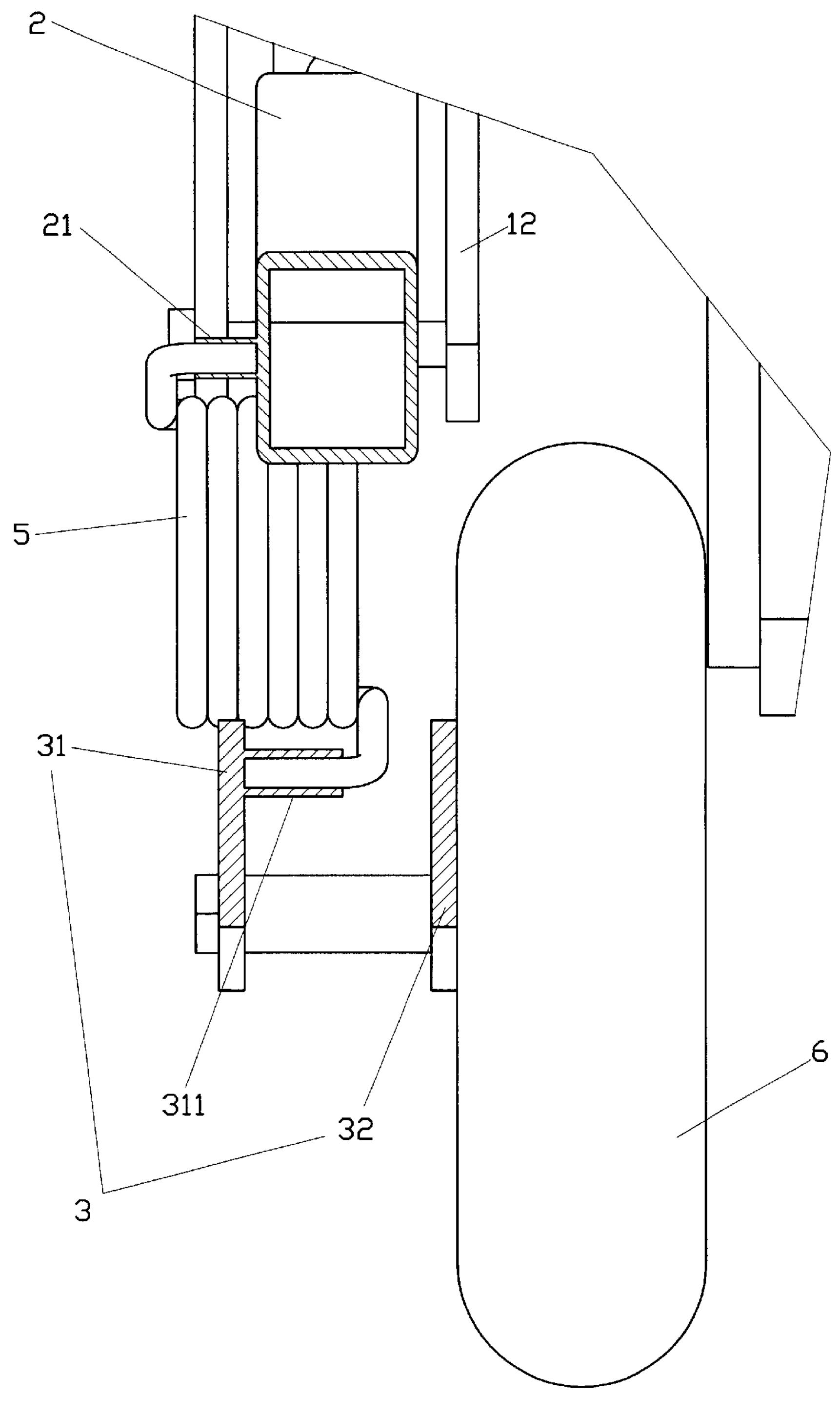
FIG. 3 is a sectional view of a spring assembly in the present invention.

As illustrated in FIGS. 2 and 3, upon assembling the present invention to a body (8) provided with at least one drive wheel (82) of the motorized wheelchair, the top of the chassis (1) supports a seat (81) and the bottom of the chassis (1) is pivoted with the rockers (2) and the wheel supports (3). The rockers (2) are pivoted to the brackets (12) with their bends at the front end extending to be provided on both sides of the bottom of the chassis (1). The buffer (4) is provided between the side rod (11) of the chassis (1) and the rocker (2). The curved end of the rocker (2) is pivoted to the wheel support (3). The two bend plates (31) and (32) of the wheel support (3) are respectively mounted to both sides of the rocker (2). One end of the spring (5) is inserted to the retainer tube (21) of the rocker (2), and the other end of the spring (5) is inserted into the positioning tube (311). Furthermore, two ends of each of the two bend plates (31) and (32) are respectively pivoted to the auxiliary wheel (6) and the tilt-proof wheel (7). The tilt-proof wheel (7) is suspended without contacting the ground; instead, the auxiliary wheel (6) provided on the side of the bend plate (31) contacts the ground.

Figure 4:
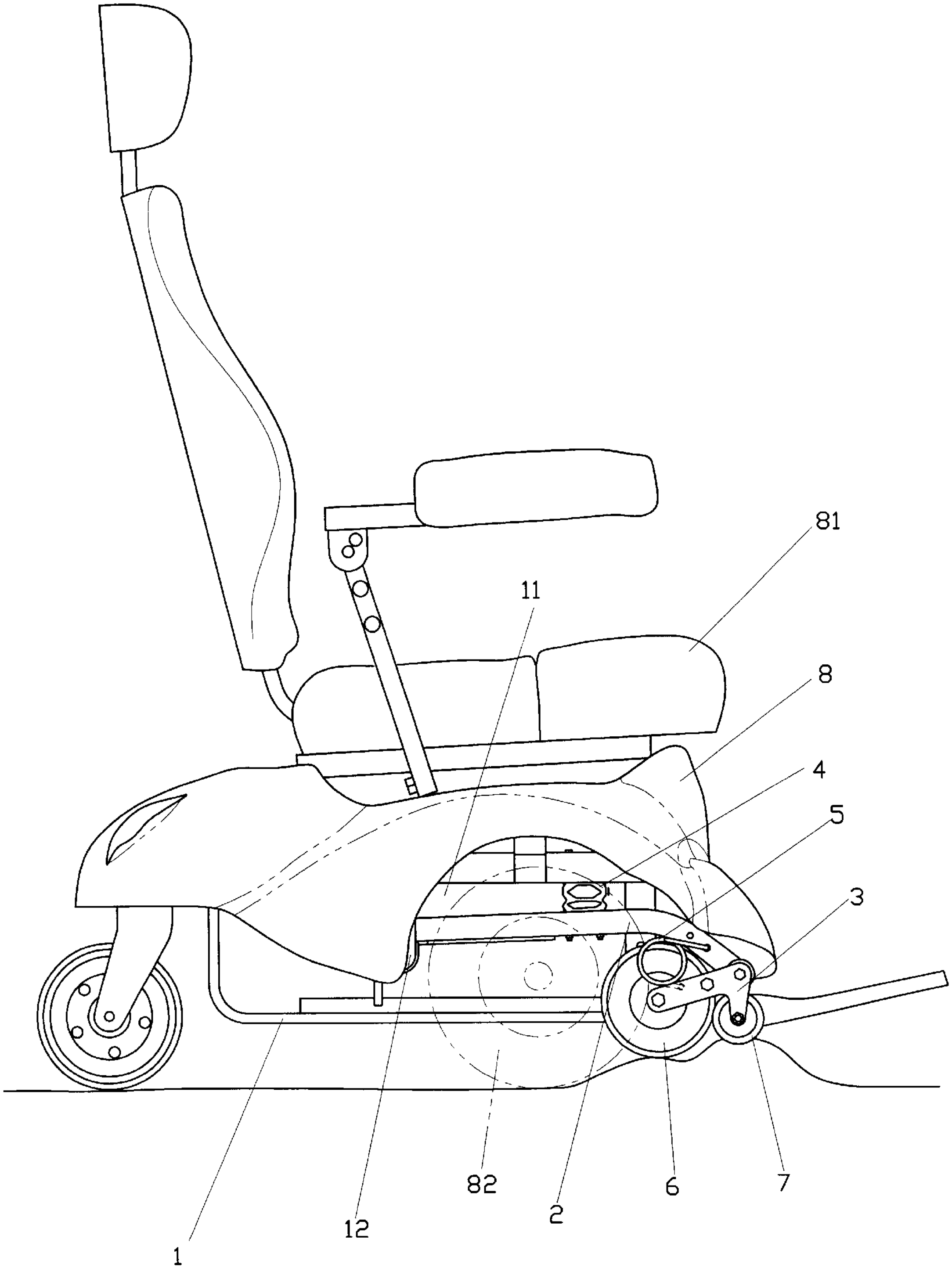
FIG. 4 is a side view showing that a motorized wheelchair adapted with the present invention is passing a rough ground.

Now referring to FIGS. 3 and 4, when the motorized wheelchair travels on a rough ground, the auxiliary wheel (6) is elevated to cause the two bend plates (31) and (32) also rise. Since one end of the spring (5) is fixed to the rocker (2) while another end of the spring (5) moves upward together with the bend plate (31) to twist, the tilt-proof wheel (7) pivoted to the two bend plates (31) and (32) descends to contact the ground by leverage as both bend plates (31) and (32) are driven by the auxiliary wheel (6) to elevate. Under such status, the auxiliary wheel (6) and the tilt-proof wheel (7) contact the ground at the same time to provide firm support. The rocker (2) compresses the buffer (4) in relation to the chassis (1), and the buffers (4) are displaced with its hollow portion (421) and the outer gap (422) to absorb the vibration.

When the motorized wheelchair travels on a flat rod, the auxiliary wheel (6) drives the two bend plates (31) and (32) to return to their normal status as illustrated in FIG. 2, so that both plates (31) and (32) automatically return to their original location due to the return force from the spring (5). As a result, the tilt-proof wheel (7) rises again to return to its position where not contacting the ground.

Figure 5:
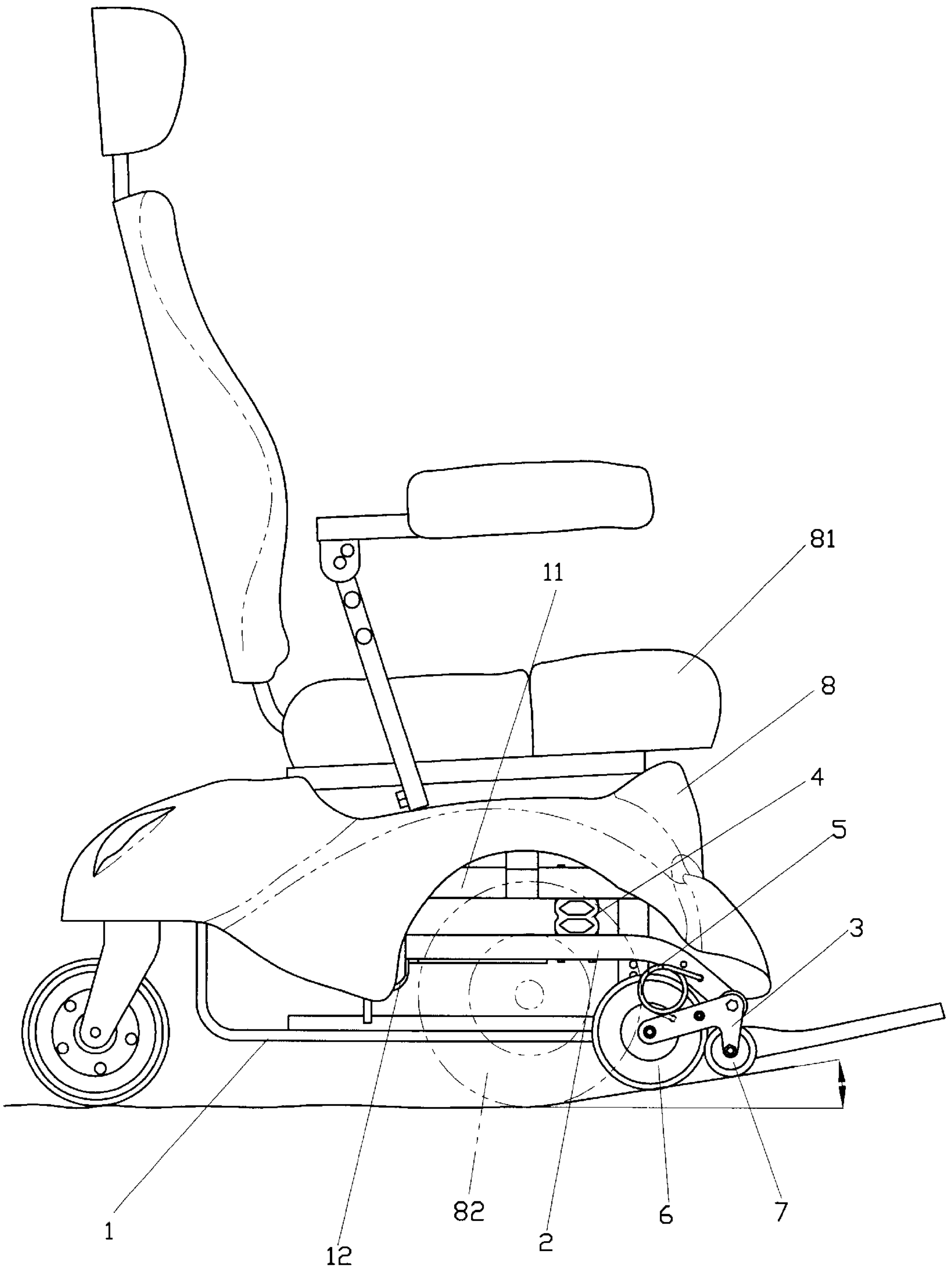
FIG. 5 is a side view showing that the motorized wheelchair adapted with the present invention is climbing over an upper hill.

When the motorized wheelchair climbs up an uphill road section as illustrated in FIG. 5, the auxiliary wheel (6) is forced to rise as the slope of the ground increases. The tilt-proof wheel (7) at the ends of both bend plates (31) and (32) descends to contact the slope as the auxiliary wheel (6) elevates to make sure that the body (8) advances in steady.

I claim:

1. A supplementary wheel support for a motorized wheelchair comprising a chassis having two sides, wherein each side comprise a rocker, wheel support buffer, spring, auxiliary wheel side rod and tilt-proof wheel; wherein, both side rods of said chassis and respectively pivoted with a first end of each said rocker; a second end of said rocker being pivoted to said wheel support; each said buffer being fixed between said chassis and said rocker; said wheel support being bent with two ends and a bent portion to define a triangular contour; both said ends of said wheel support being respectively pivoted to said auxiliary wheel and said tilt-proof wheel; said bent portion of said wheel support being pivoted to the second end of said rocker and, wherein are both ends the spring are respectively provided on said rocker and said wheel support.

2. A supplementary wheel support for a motorized wheelchair comprising a chassis having two sides, wherein each side comprise a rockers, wheel support side rod and buffer wherein, both side rods of said chassis are respectively pivoted with a rocker, and said wheel support being pivoted to a front end of said rocker, wherein one buffer is provided between said chassis and each said rocker; said buffer being sandwiched by hardwood pieces; both said hardwood pieces being packed with a resilient buffer pad; and wherein a hollow portion and a gap are respectively provided inside and on an outer side of said buffer pad.

* * * * *